United States Patent
Heo

(10) Patent No.: US 9,712,655 B2
(45) Date of Patent: Jul. 18, 2017

(54) IN-VEHICLE VOICE RECEPTION SYSTEM USING AUDIO BEAMFORMING AND METHOD FOR CONTROLLING THEREOF

(71) Applicant: HYUNDAI MOTOR COMPANY, Seoul (KR)

(72) Inventor: Kwang Seung Heo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/920,747

(22) Filed: Oct. 22, 2015

(65) Prior Publication Data

US 2016/0173676 A1 Jun. 16, 2016

(30) Foreign Application Priority Data

Dec. 11, 2014 (KR) ........................ 10-2014-0178152

(51) Int. Cl.
*H04M 1/00* (2006.01)
*H04M 1/60* (2006.01)
*H04R 1/32* (2006.01)

(52) U.S. Cl.
CPC ........... *H04M 1/6091* (2013.01); *H04R 1/326* (2013.01); *H04R 2430/23* (2013.01)

(58) Field of Classification Search
CPC ............................ H04R 1/406; H04R 2203/12
USPC ......... 455/569.1, 276.1; 381/77, 92; 725/18; 718/104; 348/143; 710/308; 701/36; 340/902, 815.4
See application file for complete search history.

(56) References Cited

U.S. PATENT DOCUMENTS

| 7,577,260 B1* | 8/2009 | Hooley | F41H 13/0081 381/307 |
| 2006/0075422 A1* | 4/2006 | Choi | G01S 3/7864 725/18 |
| 2008/0154613 A1 | 6/2008 | Haulick et al. | |
| 2010/0242046 A1* | 9/2010 | Mori | G06F 9/5061 718/104 |
| 2012/0249785 A1* | 10/2012 | Sudo | H04N 7/183 348/143 |
| 2014/0309879 A1* | 10/2014 | Ricci | H04W 48/04 701/36 |

(Continued)

FOREIGN PATENT DOCUMENTS

| JP | 2007-181099 A | 7/2007 |
| KR | 10-2006-0085392 A | 7/2006 |
| KR | 10-0801061 B1 | 2/2008 |

(Continued)

OTHER PUBLICATIONS

Korean Office Action issued in Korean Application No. 10-2014-0178152 dated Nov. 21, 2015.

*Primary Examiner* — Kiet Doan
(74) *Attorney, Agent, or Firm* — McDermott Will & Emery LLP

(57) ABSTRACT

A sound signal processing system for achieving a handsfree function irrespective of positions of passengers using one microphone includes a microphone including a plurality of cores, and a head unit for generating a plurality of beams using a plurality of analog signals inputted from each of the plurality of cores, searching for a sound signal through each of the plurality of beams to select one beam, and outputting a sound signal corresponding to the selected beam.

14 Claims, 5 Drawing Sheets

(56) References Cited

U.S. PATENT DOCUMENTS

2015/0261686 A1\* 9/2015 Nampoothiri .......... G06F 13/28
710/308

FOREIGN PATENT DOCUMENTS

| KR | 10-1103794 B1 | 1/2012 |
| KR | 10-2013-0078919 A | 7/2013 |
| KR | 10-1337145 B1 | 12/2013 |
| KR | 10-2014-0030686 A | 3/2014 |

\* cited by examiner

FIG. 1A
FIG. 1B
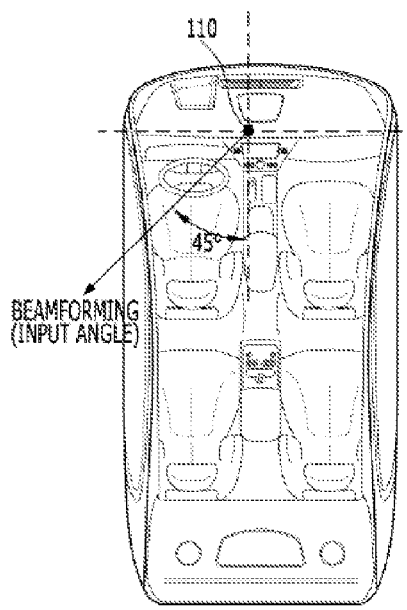
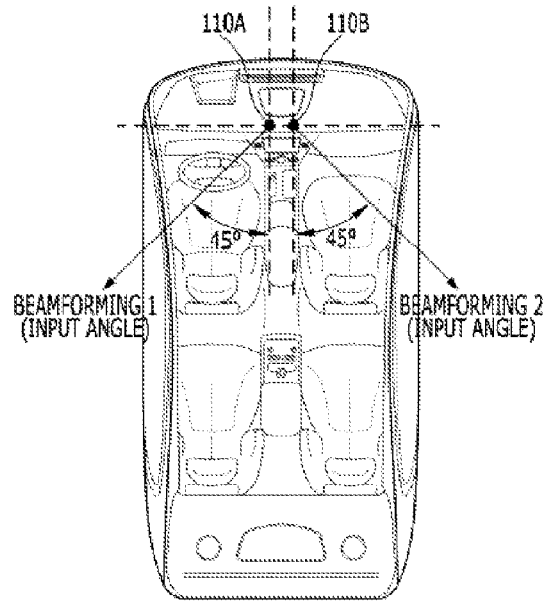

IN-VEHICLE VOICE RECEPTION SYSTEM USING AUDIO BEAMFORMING AND METHOD FOR CONTROLLING THEREOF

CROSS-REFERENCE TO RELATED APPLICATION

This application claims priority to and the benefit of Korean Patent Application No. 10-2014-0178152, filed on Dec. 11, 2014 in the Korean Intellectual Property Office, the disclosure of which is hereby incorporated by reference as if fully set forth herein.

TECHNICAL FIELD

The present disclosure relates to a voice processing method and a vehicle for performing the method, for achieving a handsfree function irrespective of positions of passengers using one microphone.

BACKGROUND

Recently, a handsfree function using Bluetooth has been installed in a vehicle in order to prevent inconvenience and accidents due to cell phone conversation. The handsfree function is embodied to output voice of the other user through a speaker of the vehicle and to input driver's voice through a microphone installed in the vehicle.

In general, a microphone includes only one core for receiving actual sound. However, the core of the microphone has directivity, and thus efficiency for receiving sound input within a specific direction range and efficiency for receiving sound input within other directions are different (that is, receive sensitivity for sound input in the remaining directions is degraded).

Accordingly, when receive sensitivity at either a driver seat or driver and passenger seats is considered, a microphone is arranged as shown in FIG. 1.

FIGS. 1A and 1B are diagrams illustrating configurations of a microphone located inside a general vehicle.

Referring to FIG. 1A, when a handsfree function is installed for only a driver seat, one microphone 110 is disposed to achieve the highest receive sensitivity upon being directed toward a driver seat. In this case, it may be said that audio beamforming is achieved toward a driver seat.

When a passenger of a passenger seat as well as a driver is considered, as shown in FIG. 1B, if a microphone 110A toward a driver seat and a microphone 110B toward the passenger seat are separately installed so as to form beamforming for each position of the passengers, voice input could be optimized.

General microphone arrangement like FIG. 1B requires plural microphones separately arranged for each position inside a vehicle. It has been a problem that the microphone arrangement could not consider factors causing difference and direction for beamforming, such as occupant's seat location or occupant's physique in a vehicle.

SUMMARY

Embodiments of the invention can be directed to a voice input system for a vehicle based on beamforming and a method for controlling the same that substantially obviates or reduces one or more problems due to limitations and disadvantages of the related art.

Embodiments of the invention can provide a vehicle for optimizing voice input through one microphone irrespective of a position of occupant who wants to input voice through a handsfree function and a method for controlling the vehicle.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an embodiment, a voice inputting system for a vehicle includes a microphone including a plurality of cores, and a head unit for generating a plurality of beams based on a plurality of analog signals inputted from the plurality of cores, searching for a sound signal through each of the plurality of beams to select one beam, and outputting a sound signal corresponding to the selected beam.

In another embodiment, a method for controlling a voice inputting system for a vehicle includes receiving a plurality of analog signals generated through each of a plurality of cores from a microphone including the plurality of cores, generating a plurality of beams using the plurality of analog signals, selecting one of the beams by searching for a sound signal through each of the plurality of beams, and outputting a sound signal corresponding to the selected beam to an external device.

In another embodiment, a sound signal processing system for a vehicle includes a microphone including a plurality of cores arranged to receive sounds from different directions, a digital converter (DSP) for generating a plurality of beams using a plurality of analog signals input from the respective cores and searching for a sound signal through each of the plurality of beams to primarily selecting one beam for each preset section, a controller for secondarily selecting one of beams selected for each preset section, and a Bluetooth module for transmitting a sound signal corresponding to the secondarily selected beam to an outside.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1A and 1B are diagrams illustrating configurations of a microphone disposed in a general vehicle;

DETAILED DESCRIPTION

Figure 2:
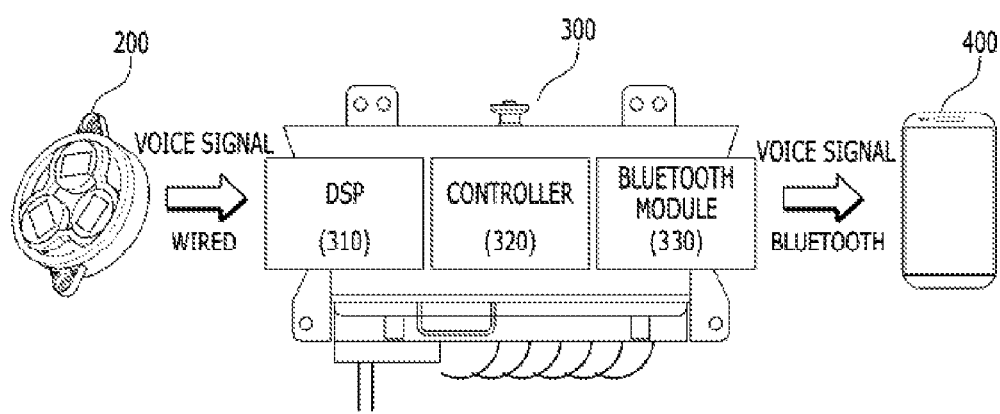
FIG. 2 is a diagram illustrating a configuration of a sound inputting and processing system for a vehicle according to an embodiment of the present invention.

Reference will now be made in detail to the preferred embodiments of the present invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defied as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the present invention, certain detailed explanations of related art are omitted when it is deemed that they may unnecessarily obscure the essence of the invention. The features of the present invention will be more clearly understood from the accompanying drawings and should not be limited by the accompanying drawings. It is to be appreciated that all changes, equivalents, and substitutes that do not depart from the spirit and technical scope of the present invention are encompassed in the present invention.

An embodiment of the present invention proposes a method of receiving a voice band signal through a microphone including a plurality of cores that are arranged in different directions, forming a plurality of simultaneous audio beamforming using the received signal, selecting an optimum voice signal among the received signal, and then transmitting the optimum voice signal to a wirelessly connected mobile terminal (i.e., a portable phone).

Here, audio beamforming refers to technology for amplifying only sound generated from a desired direction using a difference in frequency characteristics or time periods when sounds generated from the same sound source reach respective cores.

First, a system configuration according to an embodiment of the present invention will be described with reference to FIG. 2.

FIG. 2 is a diagram illustrating an example of a configuration of a sound inputting and processing system for a vehicle according to an embodiment of the present invention.

Referring to FIG. 2, the sound inputting and processing system for a vehicle according to the present embodiment may include a microphone 200 including a plurality of cores and for converting a voice signal inputted via each core into an electrical signal, and a head unit 300 for processing an electrical signal for each core into a plurality of beams, transmitted from the microphone 200, selecting sound corresponding to one beam among the beams, and transmitting the sound to an external device 400.

Here, the head unit 300 may include a digital converter (Digital Signal Processor, DSP) 310 for beamforming-processing an electrical signal transmitted from each core via the microphone 200 into a plurality of beams, searching for beams for every section and selecting one beam for each section, a controller 320 for selecting any one (i.e., a beam position) of the selected beam for each section and noise-reduction-processing a signal corresponding to the selected beam, and a Bluetooth module 330 for transmitting the noise-reduction-processed signal to the external device 400.

Next, a configuration of a microphone will be described in more detail with reference to FIG. 3.

Figure 3:
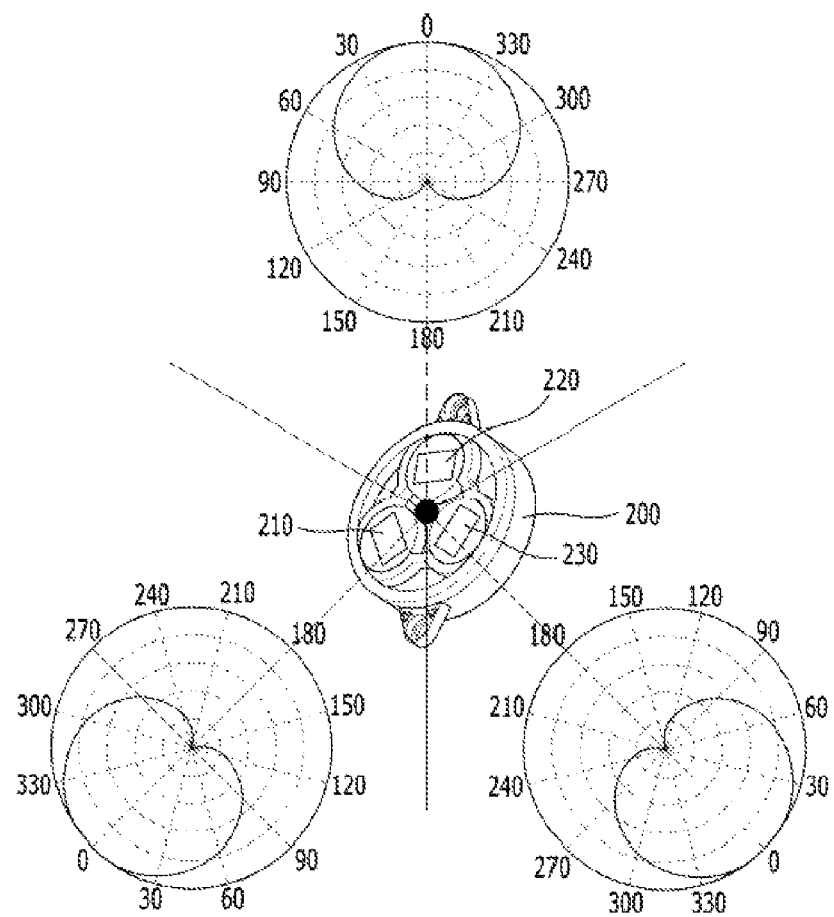
FIG. 3 is a diagram illustrating a configuration of a microphone including a plurality of cores according to an embodiment of the present invention.

FIG. 3 is a diagram illustrating an example of a configuration of a microphone including a plurality of cores according to an embodiment of the present invention.

Referring to FIG. 3, the microphone 200 is configured in such a way that three coin type cores 210, 220, 230 are arranged to cover (i.e., receive) sounds from different directions. Each core is disposed to receive sound at a predetermined angle. In this regard, in the case of FIG. 3, as illustrated in a graph adjacent to each core, each core is responsible for about 120 degrees, and thus all directions may be covered through the three cores.

Sounds input through the respective cores are separately converted into electrical signals to generate three different analog electrical signals.

The core arrangement of FIG. 3 is exemplary and thus may be changed such that greater cores are arranged to have different input patterns.

Next, section division and beams formed for the respective sections will be described with reference to FIG. 4.

Figure 4:
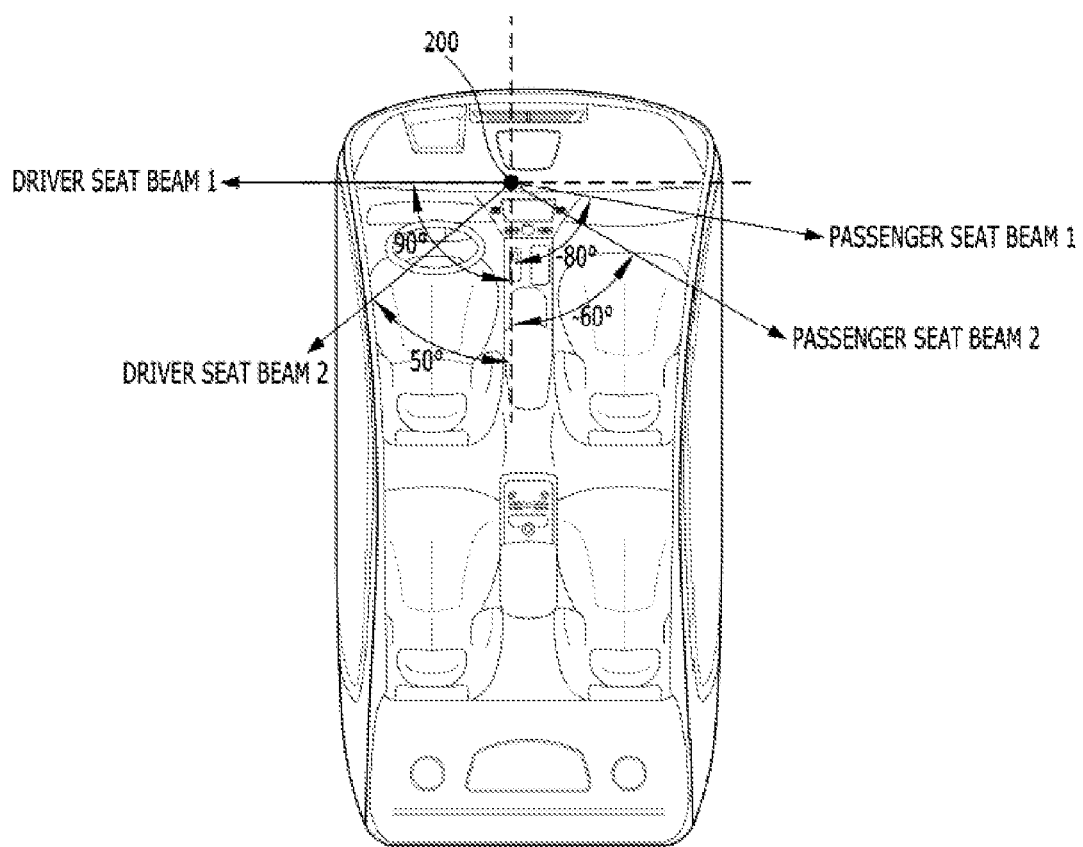
FIG. 4 is a diagram illustrating an example of a case in which an inner part of a vehicle is divided into sections and beams are formed for the respective sections, according to an embodiment of the present invention.

FIG. 4 is a diagram illustrating an example of a case in which an inner part of a vehicle is divided into sections and beams are formed for the respective sections, according to an embodiment of the present invention.

The head unit 300 receives three analog sound signals from the microphone 200. In this regard, the DSP 310 may simultaneously and automatically search the received signals in a plurality of sections (i.e., beams) to extract a voice signal.

Referring to FIG. 4, the microphone 200 with the aforementioned configuration is disposed between a passenger seat and a driver seat in the vehicle and an inner part of the vehicle is subdivided into a driver seat section and a passenger seat section. Four of total beams are formed with two beams for each section (i.e., two beams for a driver seat and two beams for a passenger beam), each beam may be formed in different directions, and the DSP 310 automatically extracts signals while circulating signals from two beams at each section.

Needless to say, the direction and number of beams illustrated in FIG. 4 are exemplary. In some embodiments, it would be obvious to one of ordinary skill in the art that greater or fewer beams may be formed and directions thereof are variable.

Hereinafter, a procedure for inputting and processing sound according to the system and environment described with reference to FIGS. 2 to 4 will be described with reference to FIGS. 5A and 5B.

Figure 5A:
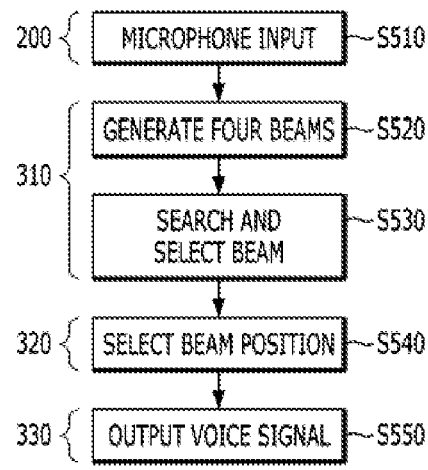
FIGS. 5A and 5B are flowcharts illustrating a procedure for selecting and transmitting optimum sound via audio beamforming in a sound inputting/processing system according to an embodiment of the present invention.
Figure 5B:
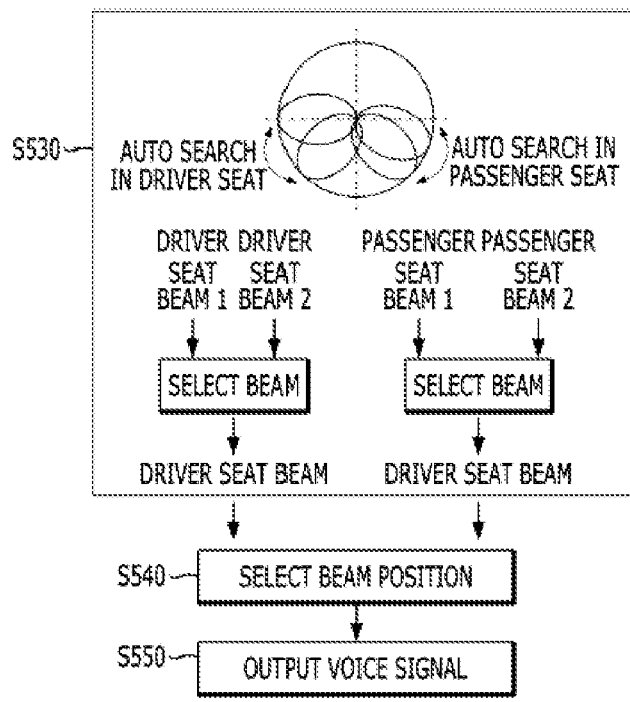

FIGS. 5A and 5B are flowcharts illustrating a procedure for selecting and transmitting optimum sound via audio beamforming in a sound inputting/processing system according to an embodiment of the present invention.

FIG. 5A is a flowchart of a sound selecting procedure via audio beamforming, and FIG. 5B is a flowchart illustrating some processes of the flowchart of FIG. 5A in more detail.

Referring to FIGS. 5A and 5B, sound (i.e., passenger's voice) is input through the microphone 200 (S510). In more detail, the sound is converted into three analog sound signals through each of the three cores of the microphone 200 and transmitted to the DSP 310.

The DSP 310 converts the three input analog sound signals into digital signals. In more detail, the DSP 310 simultaneously forms four of total beams, that is, two beams for a driver seat and two beams for a passenger seat using the three sound signals input from a microphone (S520).

In addition, the DSP 310 searches the four beams with input patterns formed at a predetermined angle for respective sections at a predetermined time interval to extract sound signals from each beam section and compares the intensities of the signals extracted through the four beams to select one beam for each section (S530).

The controller 320 selects a signal with highest intensity, extracted from the selected beams for the driver seat and passenger seat, to select a beam position, noise-reduction-processes the voice signal extracted from the selected beam, and transmits the voice signal to the Bluetooth module 330 (S540).

The noise-reduction-processed sound signal may be output to the outside through the Bluetooth module 330 (S540).

Through the aforementioned procedure, any one may be selected among a plurality of beams formed in different directions, and thus both a driver and a passenger are capable of inputting optimum sound using one microphone during use of a handsfree function. In addition, optimum sound may be input via beam selection irrespective of position change according to a speaker's body condition or seat position.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, carrier wave such as transmission via the Internet, etc.

According to at least one embodiments of the present invention, the following advantages may be achieved.

Both a driver and a passenger are capable of inputting optimum sound using one microphone during use of a handsfree function.

Any one may be selected among a plurality of beams, and thus optimum sound is capable of being input irrespective of position change according to a speaker's body condition or seat position.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A voice inputting system for a vehicle, comprising:
a microphone comprising a plurality of cores, each having different sensitivities to receive sounds from different directions inside the vehicle; and
a head unit, arranged inside the vehicle, for generating a plurality of beams based on analog signals converted from the sounds by the plurality of cores, identifying a beam having the highest intensity among the plurality of beams to select one beam, and outputting a sound signal corresponding to the identified beam,
wherein the head unit comprises a digital converter for generating the plurality of beams and searching for a beam having the highest intensity among the plurality of beams to select one beam for each preset section,
wherein the preset section comprises a driver seat section and a passenger seat section, and
wherein the digital converter selects a first beam among a plurality of beams formed in the driver seat section and a second beam among a plurality of beams formed in the passenger beam section.

2. The voice inputting system according to claim 1, wherein the digital converter compares intensities of sound signals searched for through each of the plurality of beams to select the first beam and the second beam.

3. The voice inputting system according to claim 1, wherein the head unit comprises a controller for selecting one of the first beam and the second beam and noise-reduction-processing a sound signal corresponding to the selected beam.

4. The voice inputting system according to claim 3, wherein the head unit compares intensities of sound signals searched for through each of the first beam and the second beam to select one of the first beam and the second beam.

5. The voice inputting system according to claim 3, wherein the head unit comprises a Bluetooth module for transmitting the noise-reduction-processed sound signal to an outside.

6. The voice inputting system according to claim 1, wherein the number of the plurality of cores is three, while the number of the plurality of beams is four.

7. The voice inputting system according to claim 6, wherein two of the four beams are formed in the driver seat section and the other two are formed in the passenger seat section.

8. A method for controlling a voice inputting system for a vehicle, the method comprising:
receiving a plurality of analog signals generated through each of a plurality of cores of a microphone, wherein each core is arranged to have different sensitivities from different directions inside the vehicle;
generating a plurality of beams using the plurality of analog signals;
selecting one of the beams by searching for a sound signal through each of the plurality of beams; and
outputting a sound signal corresponding to the selected beam to an external device,
wherein the selecting of one beam further comprises selecting one beam for each preset section by a digital converter, and the generating is performed by the digital converter,
wherein the preset section comprises a driver seat section and a passenger seat section, and
wherein the selecting of one beam further comprises selecting a first beam among a plurality of beams formed in the driver seat section and a second beam among a plurality of beams formed in the passenger beam section by the digital converter.

9. The method according to claim 8, wherein the selecting of the first beam and the second beam is performed by comparing intensities of sound signals searched for through each of the plurality of beams.

10. The method according to claim 8, wherein the selecting of one beam further comprises:
selecting one of the first beam and the second beam by a controller; and
noise-reduction-processing a sound signal corresponding to the selected beam.

11. The method according to claim 10, wherein the selecting of one of the first beam and the second beam comprises comparing intensities of sound signals searched for through each of the first beam and the second beam.

12. The method according to claim 10, wherein the outputting comprises transmitting the noise-reduction-processed sound signal to an outside by a Bluetooth module.

13. The method according to claim 8, wherein the number of the plurality of cores is three, while the number of the plurality of beams is four, wherein two of the four beams are formed in the driver seat section and the other two are formed in the passenger seat section.

14. A sound signal processing system for a vehicle, comprising:

a microphone comprising a plurality of cores, each core arranged to receive sounds from different directions inside the vehicle;

a digital converter for generating a plurality of beams using a plurality of analog signals input from the respective cores and searching for a sound signal through each of the plurality of beams to primarily selecting one beam for each preset section;

a controller for secondarily selecting one of beams selected for each preset section; and a Bluetooth module for transmitting a sound signal corresponding to the secondarily selected beam to an outside, wherein the preset section comprises a driver seat section and a passenger seat section.

\* \* \* \* \*